(12) United States Patent
Harvey

(10) Patent No.: US 11,364,991 B2
(45) Date of Patent: Jun. 21, 2022

(54) AIRCRAFT PROPULSION SYSTEM

(71) Applicant: ROLLS-ROYCE plc, London (GB)

(72) Inventor: Giles E. Harvey, Derby (GB)

(73) Assignee: Rolls-Royce plc

( * ) Notice: Subject to any disclaimer, the term of this patent is extended or adjusted under 35 U.S.C. 154(b) by 337 days.

(21) Appl. No.: 16/546,372

(22) Filed: Aug. 21, 2019

(65) Prior Publication Data

US 2020/0070990 A1 Mar. 5, 2020

(30) Foreign Application Priority Data

Sep. 3, 2018 (GB) .................................... 1814255
Sep. 3, 2018 (GB) .................................... 1814256
Sep. 13, 2018 (GB) .................................... 1814869

(51) Int. Cl.
| | | |
|---|---|---|
| *B64C 11/48* | (2006.01) | |
| *B64D 27/24* | (2006.01) | |
| *H02K 7/116* | (2006.01) | |
| *H02K 7/14* | (2006.01) | |
| *B64C 11/00* | (2006.01) | |
| *H02K 16/02* | (2006.01) | |
| *H02K 16/00* | (2006.01) | |

(Continued)

(52) U.S. Cl.
CPC ............ *B64C 11/48* (2013.01); *B64C 11/001* (2013.01); *B64D 27/24* (2013.01); *H02K 7/116* (2013.01); *H02K 7/14* (2013.01); *H02K 16/00* (2013.01); *H02K 16/02* (2013.01); *H02K 21/14* (2013.01); *H02K 21/22* (2013.01)

(58) Field of Classification Search
CPC ....... B64C 11/48; B64C 11/001; H02K 7/116; H02K 7/14; H02K 16/00; H02K 21/22; H02K 21/14; H02K 16/02; B64D 27/24; B64D 2027/005; B64D 2027/026; B64D 27/02; B64D 27/00; Y02T 50/60; Y02T 50/40
USPC ......................................................... 310/114
See application file for complete search history.

(56) References Cited

U.S. PATENT DOCUMENTS 1,879,142 A 9/1932 Egan
3,729,957 A 5/1973 Petrie et al.
(Continued)

FOREIGN PATENT DOCUMENTS

CN 205256667 5/2016
CN 107054597 8/2017
(Continued)

OTHER PUBLICATIONS

European Search report dated Feb. 13, 2020, issued in EP Patent Application No. 19189980.
(Continued)

*Primary Examiner* — John K Kim
(74) *Attorney, Agent, or Firm* — Barnes & Thornburg LLP

(57) ABSTRACT

An aircraft propulsion system comprises first and second co-axial propulsors, one of the first and second propulsor being positioned forward of the other propulsor. A first electric motor is configured to drive the first propulsor, and a second electric motor is configured to drive the second propulsor. The first electric motor comprising a rotor radially inwardly of the stator, and the second electric motor comprises a rotor radially outwardly of the stator. The stator of the first electric motor is mounted to the stator of the second electric motor.

20 Claims, 7 Drawing Sheets

(51) Int. Cl.
*H02K 21/22* (2006.01)
*H02K 21/14* (2006.01)

(56) References Cited

U.S. PATENT DOCUMENTS

| | | |
|---|---|---|
| 3,861,139 A | 1/1975 | Jones |
| 7,410,122 B2 | 8/2008 | Robbins et al. |
| 7,765,786 B2 | 8/2010 | Klingels et al. |
| 2008/0089786 A1* | 4/2008 | Sinreich .................. B63H 5/10 416/129 |
| 2011/0014058 A1* | 1/2011 | Clemen .................. B64C 11/14 416/223 R |
| 2013/0174533 A1 | 7/2013 | Ribarov et al. |
| 2013/0181562 A1 | 7/2013 | Gieras et al. |
| 2016/0099636 A1 | 4/2016 | Fricasse |
| 2018/0079515 A1* | 3/2018 | Harwood .................. H02P 5/74 |
| 2018/0138761 A1 | 5/2018 | Niergarth et al. |
| 2020/0070990 A1* | 3/2020 | Harvey .................. B64C 11/48 |

FOREIGN PATENT DOCUMENTS

| | | |
|---|---|---|
| CN | 206939096 | 1/2018 |
| DE | 3834511 | 4/1990 |
| DE | 202005020124 | 5/2006 |
| DE | 102011084360 | 4/2013 |
| DE | 10201607428 | 11/2017 |
| EP | 1777369 | 4/2007 |
| EP | 2551198 | 1/2013 |
| EP | 3290334 | 3/2018 |
| EP | 3300231 | 3/2018 |
| EP | 3367540 | 8/2018 |
| WO | 2014021798 | 2/2014 |
| WO | 2016020915 | 2/2016 |
| WO | 2018065709 | 4/2018 |

OTHER PUBLICATIONS

European Search report dated Feb. 18, 2020, issued in EP Patent Application No. 19189981.
European Search report dated Feb. 19, 2020, issued in EP Patent Application No. 19189982.
Great Britain search report dated Feb. 21, 2019, issued in GB Patent Application No. 1814255.4.
Great Britain search report dated Feb. 25, 2019, issued in GB Patent Application No. 1814256.2.
Great Britain search report dated Mar. 4, 2019, issued in GB Patent Application No. 1814869.2.

* cited by examiner

AIRCRAFT PROPULSION SYSTEM

CROSS-REFERENCE TO RELATED APPLICATIONS

This application is based upon and claims the benefit from priority British Patent Application No. 1814255.4 filed 3 Sep. 2018, British Patent Application No. 1814256.2 filed 3 Sep. 2018, and British Patent Application No. 1814869.2 filed 13 Sep. 2018, the entire contents of each of which are incorporated herein.

BACKGROUND

Technical Field

The present disclosure concerns a propulsion system for an aircraft.

Description of the Related Art

In the pursuit of reduced fuel burn and/or other emissions, electric aircraft propulsors are being developed. In an electric aircraft propulsor, a ducted fan or open rotor propeller is driven by an electric motor by electrical power provided from one or both of a battery and a prime mover such as an internal combustion engine driven electrical generator. Where the electric power for the electric motors is provided by an internal combustion engine, such a system is known as a "hybrid electric propulsion system".

SUMMARY

According to a first aspect there is provided an aircraft propulsion system comprising:
first and second co-axial propulsors, one of the first and second propulsor being positioned upstream of the other propulsor;
a first electric motor configured to drive the first propulsor, and a second electric motor configured to drive the second propulsor;
the first electric motor comprising a rotor and a stator, the rotor of the first electric motor being provided radially inwardly of the stator;
the second electric motor comprising a rotor and a stator, the rotor of the second electric motor being provided radially outwardly of the stator; wherein the stator of the first electric motor is mounted to the stator of the second electric motor.

Advantageously, a mounting arrangement is provided which allows for coaxial propulsors, with a single mounting arrangement either side or between the propulsors, and without the requirement for concentric shafts. Further advantages of the disclosed system may also be realised, as detailed below.

One or both of the first and second propulsors may comprise one of an open rotor and a ducted fan.

A static mounting structure may be provided. The static mounting structure may comprise one or more radially extending struts. The radially extending struts may extend from a radially outer mounting point to a radially inner mounting point located between the first and second electric motors. The radially inner mounting point may be coupled to the stator of the first and second electric motors.

Alternatively, the static mounting structure may extend axially, and may be coupled with the stator of the first and second electric motors.

The first electric motor may be coupled to the first propulsor by an epicyclic gearbox comprising a sun gear, a plurality of planet gears mounted to a planet carrier, and a ring gear. Advantageously, the first propulsor may be configured to rotate at a slower speed than the rotor of the first electric motor. In the case of an electric motor having a rotor radially inward of a stator, relatively high rotational speeds can be achieved, giving high efficiency and power density. However, such high speeds result in high propulsor tip speeds where the rotor is directly coupled to the fan. Consequently, a highly efficient motor is provided, without the disadvantage of a high propulsor tip speed.

The stator of the first electric motor may be coupled to the planet carrier, and the rotor of the first electric motor may be coupled to the sun gear. The first propulsor may be mounted to the ring gear.

Alternatively, the stator of the first electric motor may be coupled to the ring gear, the rotor of the first electric motor may be coupled to the sun gear, and the first propulsor may be mounted to the planet carrier.

The first and/or second electric motors may comprise permanent magnet motors, and may comprise permanent magnet AC motors. Advantageously, electrical power does not have to be supplied across to the rotor, which greatly simplifies the electrical system. Where the first motor comprises a permanent magnet motor, the rotor permanent magnets of the first motor may be mounted to a sun shaft coupled to the sun gear of the epicyclic gearbox. Where the second motor comprises a permanent magnet motor, the rotor permanent magnets of the second motor may be mounted to an inner annulus of a fan rotor disc of the second propulsor.

The aircraft propulsion system may comprise a gas turbine engine. The gas turbine engine may comprise a turbine coupled to an electrical generator. The electrical generator may be electrically coupled to the first and/or second electric motor.

The first propulsor may be provided upstream of the second propulsor.

The static mounting structure may be provided downstream of the second propulsor.

According to a second aspect, there is provided an aircraft comprising a propulsion system according to the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
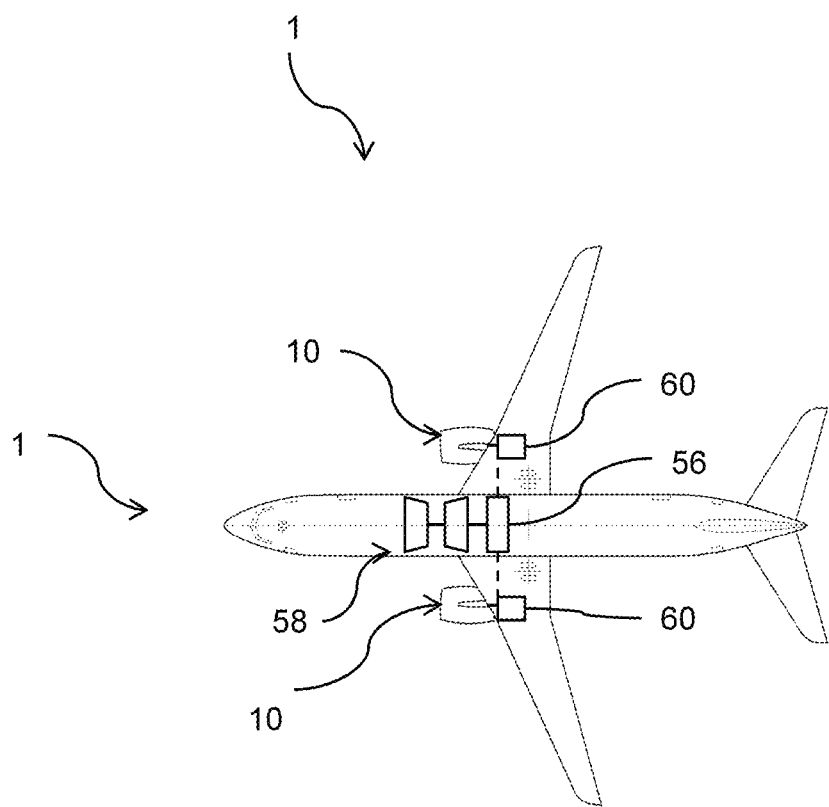
FIG. 1 is a plan view of an aircraft having a propulsion system.
Figure 2:
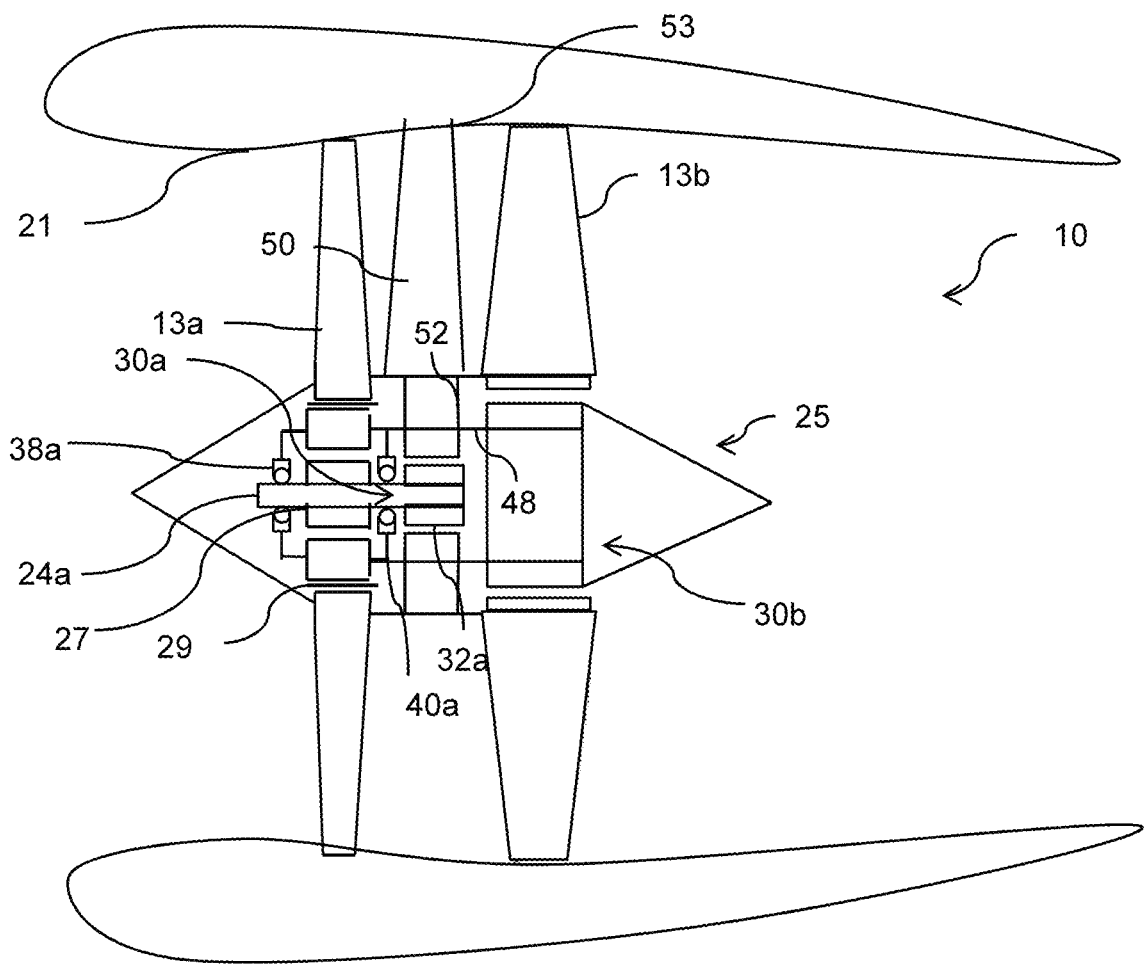
FIG. 2 is a sectional side view of a first aircraft propulsion system for the aircraft of FIG. 1.
Figures 3A, 3B:
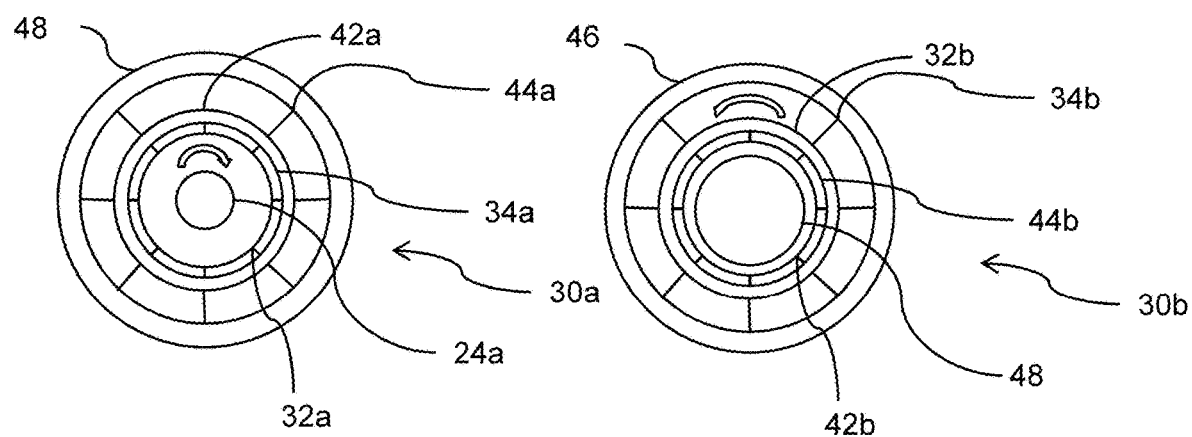
FIGS. 3*a* and 3*b* are sectional front views of a first electric motor and a second electric motor respectively of the aircraft propulsion system of FIG. 2.

With reference to FIG. 1, an aircraft 1 is shown having a propulsion system 10. The propulsion system 10 is shown in further detail in FIGS. 2 to 4, and is in the form of a ducted fan, having first and second propulsors in the form of first and second fans 13a, 13b. Each fan 13a, 13b is enclosed within a fan duct 21, and is mounted to a core nacelle 25. Each fan 13a, 13b is driven by a respective electric motor 30a, 30b. Each electric motor is supplied with electric power from a power source. In the present embodiment, the power source comprises a gas turbine engine 58, which drives a generator 56. An additional power source in the form of one or more chemical batteries 60 is also provided.

Each fan 13a, 13b is driven by a respective electric motor 30a, 30b. The first and second motors 30a, 30b are shown in further detail in FIG. 3. The first motor 30a comprises a rotor 32a comprising a plurality of permanent magnets 34a. The rotor 32a is configured to rotate in operation, and is mounted to a shaft 24a, which is in turn supported by forward and rearward bearings 38a, 40a. The first motor 30a further comprises a stator 42a separated from the rotor 32a by an "air gap" (i.e. an insulating layer, which may comprise air or some other insulating fluid such as oil) and comprises a plurality of stator segments 44a, each comprising one or more stator windings (not shown). As can be seen, the stator 42a and stator windings 44a are provided radially outward of the rotor 32a, surrounding the rotor 32a, through it will be understood that the stator windings need not necessarily completely surround the rotor. The stator 42a is statically mounted (such that the stator 42a does not rotate in use) to a static support 48. In use, the stator windings 44a are provided with electrical current (either DC or AC), to produce a magnetic field, which interacts with the magnetic field of the permanent magnets 34a of the rotor 32a to produce torque, and so rotate the rotor 34a, shaft 24a and first fan 13a in use. While the motor can generally operate in either direction, the fan 13a is configured to produce thrust most efficiently where the fan 13a rotates anti-clockwise and the rotor 32a rotates clockwise (as shown in FIG. 2a), i.e. the first and second fans 13a, 13b counter-rotate. Consequently, an "upstream" rotor 13a and a "downstream" rotor 13b are defined by the direction of airflow during normal, forward thrust.

The second motor 30b similarly comprises a rotor 32b comprising a plurality of permanent magnets 34b. The rotor 32b is configured to rotate in operation. However, the rotor 32b is mounted to an inner rim of a fan disc 46, to which fan blades of the second fan 13b are mounted. The second motor 30b further comprises a stator 42b comprising a plurality of stator segments 44b, each comprising one or more stator windings (not shown). The second motor 30b differs from the first motor 30a, in that the stator 42b and stator windings 44b are provided radially inward of the rotor 32b. In use, the stator windings are provided with electrical current (either DC or AC), to produce a magnetic field, which interacts with the magnetic field of the permanent magnets 34b of the rotor 32b to produce torque, and so rotate the rotor 34b, and second fan 13b in use. The stator 42b is also mounted to the static support 48. While the motor can generally operate in either direction, the fan 13b is configured to produce thrust most efficiently where the fan 13b and second rotor 32b rotate clockwise (as shown in FIG. 2a).

Referring again to FIG. 1, the static support 48 is mounted to the core nacelle 25 via radially extending members 52, which are in turn supported by a plurality of struts in the form of outlet guide vanes (OGVs) 50. The outlet guide vanes 50 extend radially between the core nacelle 25 and a mounting point 53 provided on an internal surface of the fan duct 21, and are located between the first and second fans 13a, 13b, such that the OGVs 50 receive air from the first fan 13a and deliver air to the second fan 13b in use. The OGVs 50 comprise static aerofoils, and are configured to remove swirl from outlet flow from the upstream fan (13a in normal use), such that maximum work can be conducted by the second fan 13b. The OGVs also provide the function of supporting both the core nacelle 25, and both the first and second motors 30a, 30b from a single location. In view of the central location of the mounting 48 and struts 50, and the contra-rotation of the fans 13a, 13b in normal use, both static and dynamic loads are relatively balanced in use, since substantially equal static loads are provided either side of the mounting, and the gyroscopic loads of the fans 13a, 13b are cancelled by their opposite rotation.

Figure 4:
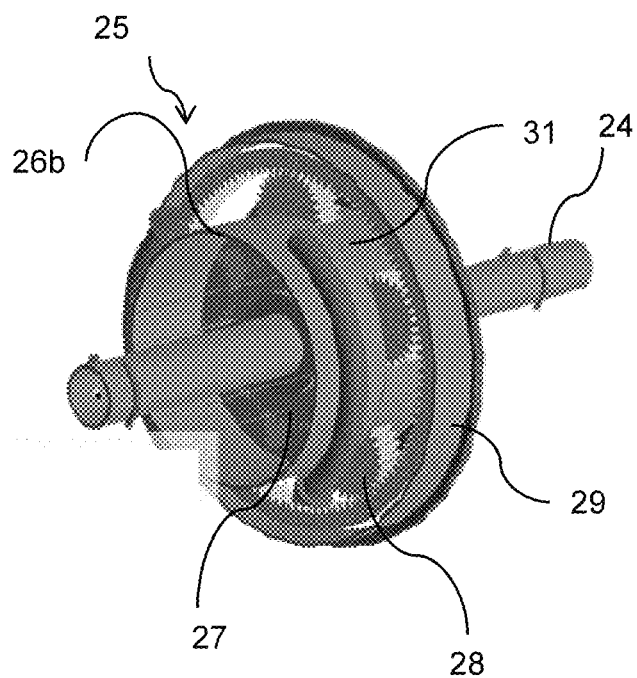
FIG. 4 is a front perspective view of an epicyclic gearbox of the propulsion system of FIG. 2.

The first motor 30a is not directly coupled to the fan 13a, but rather is connected through a reduction gearbox in the form of an epicyclic gearbox, shown in further detail in FIG. 4. The reduction gearbox 25 comprises a sun gear 27 coupled to an input shaft 24, which is in turn coupled to the rotor 32a of the first electric motor 30a. The sun gear 27 meshes with planet gears 28 which are arranged radially outward of the sun gear 27, and which in turn mesh with an annular ring gear 29 which surround the planet gears 28. The planet gears 28 are rotatably mounted to a planet carrier 31, which is in turn statically mounted to the mounting 48. The front and rear shaft bearings 38a, 40a are supported by the static planet carrier 31.

The reduction gearbox 25 is in the form of a star gearbox, in which the planet carrier 31 is held stationary (such that the planet gears 28 rotate but do not orbit around the central axis), while the ring gear 29 is free to rotate in normal use. The ring gear 29 is in turn mounted to the first fan 13a, to provide for rotation of the first fan 13a. In such an arrangement, reduction ratios of approximately 2 or 3 to 1 are achievable, such that the first fan 13a rotates at a rotational speed 2 to 3 times slower than the rotor 32a of the first electric motor 30a, and in an opposite direction.

Consequently, for a relatively low fan 13a rotational speed (which may be necessary on large fans to reduce fan tip speed to avoid excessive noise and low efficiency), a relatively high first motor 30a rotational speed can be achieved. This means that a relatively small, compact, low torque, high power electrical machine can be utilised. Such a machine may even be able to fit within the annular inner space within the stator 42b of the second electric motor 30b, thereby reducing axial length of the machine. On the other hand, a single mount 48 can be provided for the static structure of both electric motors 30a, 30b, thereby greatly simplifying the structural arrangement, and potentially reducing weight and complexity.

Meanwhile, the second fan 13b is directly coupled to the rotor 32b of the second motor 30b, and so the second motor rotor 32b and second fan 13b rotate at the same speed and in the same direction. In view of the relatively large circumference of the rotor 32b (since it is provided radially outward of the stator 42b), the circumferential velocity of the permanent magnets of the rotors 32b is relatively high. In addition, a relatively large number of poles can be provided in the large circumferential space.

The first and second fans 13a, 13b are configured to contra-rotate in use, in order to generate a nominal forward thrust in a direction X. On the other hand, each of the motors 30a, 30b could be configured to rotate in the opposite direction to provide reverse thrust.

Figure 5:
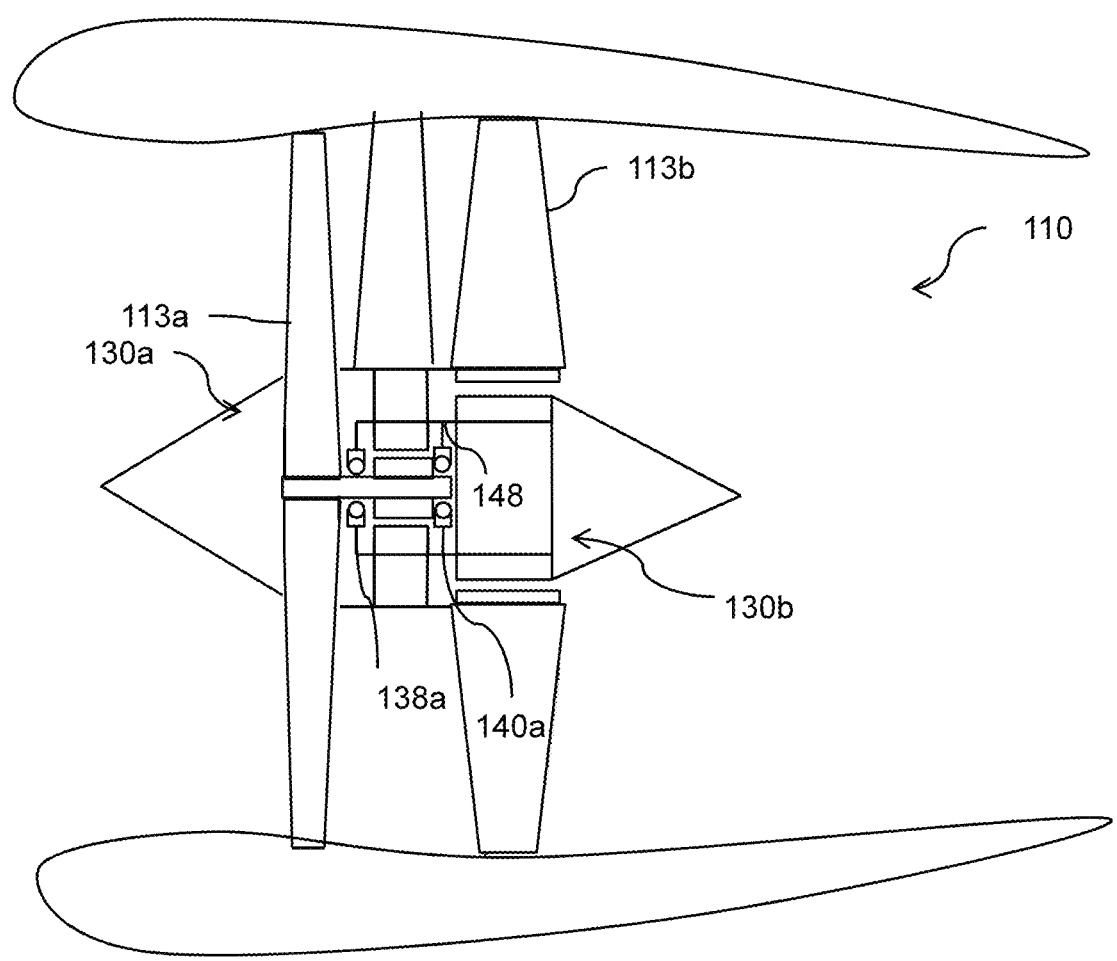
FIG. 5 is a sectional side view of a second aircraft propulsion system.

FIG. 5 shows a second propulsion system 110. The propulsion system 110 is similar in many ways to the system 10, with only differences between the two being described in detail.

The propulsion system 110 again comprises first and second fans 113a, 113b driven by respective electric motors 130a, 130b. The first and second motors 130a, 130b are similar to those of the first system 10, with the rotor of the first motor 130a being radially inward of the stator, and the rotor of the second motor 130b being outward of the stator. However, the epicyclic reduction gearbox is omitted, such that the first motor 130a directly drives the first fan 113a. Consequently, forward and rearward bearings 138a, 104a are provided either side of the first motor 130a, but the fan 113a is unsupported on one side, being cantilevered from the downstream end. Again, the bearings 138a, 140a are supported by the stator mounting 148 of the second motor 130b.

Figure 6:
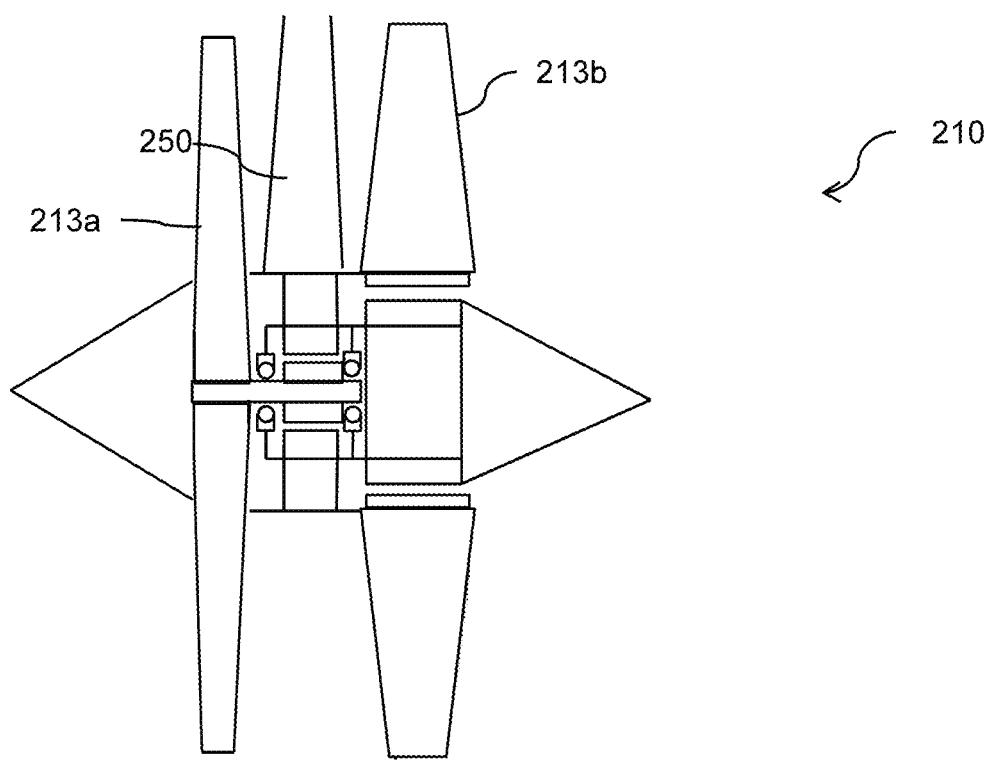
FIG. 6 is a sectional side view of a third aircraft propulsion system.

FIG. 6 shows a third propulsion system 210. The propulsion system 210 is similar to the system 110, but has open rotor propulsors in the form of propellers 113a, 113b in place of the ducted fans of the previous embodiments. The nacelle is supported by a strut 250, which may be mounted to a wing or fuselage of an aircraft.

Figure 7:
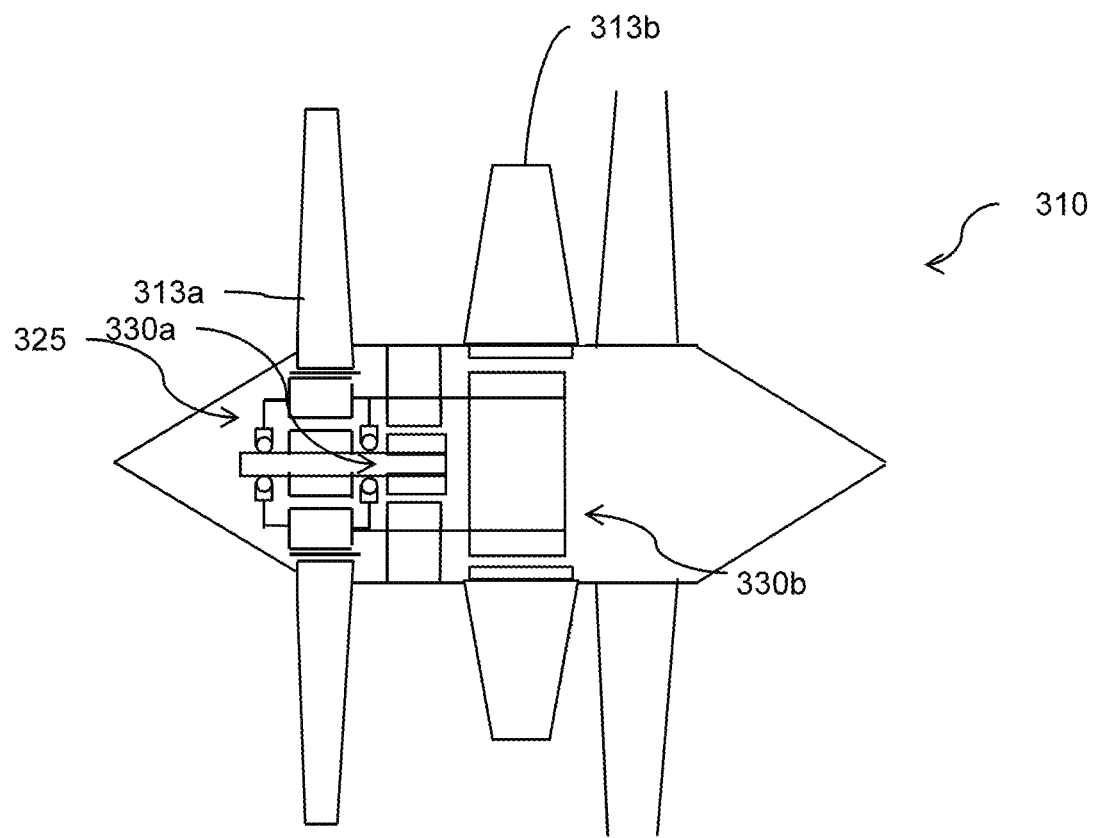
FIG. 7 is a sectional side view of a fourth aircraft propulsion system.

FIG. 7 shows a fourth propulsion system 310. The propulsion system 310 is similar to the system 210, having open rotor propellers 313a, 313b. The first propeller 313a is driven by an epicyclic gearbox in the form of a star gearbox 325, similar to that of the propulsion system 10. The second propellers 313b differs from the first propeller 313a, having a smaller diameter. In this embodiment, the second propeller 313b is configured to turn at a higher rotational speed than the first propeller 313a. Since the first propeller 313a is driven by a gearbox 325, whereas the second propeller 313b is directly driven, the first and second motors 330a, 330b can turn at similar speeds, while the propellers 313a, 313b can turn at different speeds.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, gearbox reduction ratio could be varied. Different electrical machine types could be provided. Different power sources could be provided.

The gearbox could be of a "compound" type, in which multiple stages of epicyclic gearboxes are provided.

The invention claimed is:

1. An aircraft propulsion system comprising:
   a first propulsor and a second propulsor, the first and second propulsors being co-axial, one of the first and second propulsor being positioned forward of the other propulsor;
   a first electric motor configured to drive the first propulsor, and a second electric motor configured to drive the second propulsor;
   the first electric motor comprising a first rotor and a first stator, the first rotor of the first electric motor being provided radially inwardly of the first stator; and
   the second electric motor comprising a second rotor and a second stator, the second rotor of the second electric motor being provided radially outwardly of the second stator, wherein an outer surface of the second rotor is mounted to a radially inner surface of an annular disc surrounding the second rotor and the second stator,
   wherein the first stator of the first electric motor is mounted to the second stator of the second electric motor,
   wherein a plurality of blades extend radially away from the annular disc,
   wherein the plurality of blades of the second propulsor are axially aligned with the second rotor and the second stator of the second electric motor, and
   wherein the annular disc, the plurality of blades, and the second rotor are entirely axially spaced apart from the first rotor and the first stator.

2. A system according to claim 1, wherein one or both of the first and second propulsors comprises one of an open rotor and a ducted fan.

3. A system according to claim 1, further comprising:
   a static mounting structure comprising one or more radially extending struts, the static mounting structure being mounted to the first stator and to the second stator.

4. A system according to claim 3, wherein the radially extending struts extend from a radially outer mounting point to a radially inner mounting point located between the first and second electric motors.

5. A system according to claim 4, wherein the radially inner mounting point is coupled to the first stator and the second stator of the first and second electric motors.

6. A system according to claim 1, wherein the first electric motor is coupled to the first propulsor by an epicyclic gearbox comprising a sun gear, a plurality of planet gears mounted to a planet carrier, and a ring gear.

7. A system according to claim 6, wherein the first stator of the first electric motor is coupled to the planet carrier, the first rotor of the first electric motor is coupled to the sun gear, and the first propulsor is mounted to the ring gear.

8. A system according to claim 6, wherein the first stator of the first electric motor is coupled to the ring gear, the first rotor of the first electric motor is coupled to the sun gear, and the first propulsor is mounted to the planet carrier.

9. A system according to claim 1, wherein at least one of the first and second rotors of the first and second electric motors comprise permanent magnet motors.

10. A system according to claim 9, wherein rotor permanent magnets of the first rotor of the first motor are mounted to a sun shaft coupled to the sun gear of an epicyclic gearbox.

11. A system according to claim 9, wherein the rotor permanent magnets of the second rotor of the second motor are mounted to an inner annulus of the annular disc.

12. A system according to claim 1, wherein the aircraft propulsion system comprise a gas turbine engine coupled to an electrical generator, the electrical generator being electrically coupled to the first and/or second electric motor.

13. A system according to claim 1, wherein the first propulsor is provided forward of the second propulsor.

14. A system according to claim 3, wherein the static mounting structure is provided downstream of the second propulsor.

15. An aircraft comprising the propulsion system of claim 1.

16. A system according to claim 3, wherein the static mounting structure is mounted to the first stator and to the second stator, and wherein the static mounting structure extends axially between and interconnects the first stator and the second stator.

17. A system according to claim 3, further comprising:
a fan duct arranged radially outside of and enclosing the first propulsor and the second propulsor, wherein the one or more radially extending struts of the static mounting structure extend radially outwardly and couple to an internal surface of the fan duct at a mounting point.

18. A system according to claim 17, wherein the one or more radially extending struts are outlet guide vanes that are arranged axially between a plurality of first fan blades of the first propulsor and a plurality of second fan blades of the second propulsor such that the outlet guide vanes receive air from the first propulsor and deliver air to the second propulsor during use of the system.

19. A system according to claim 17, further comprising:
a core nacelle, wherein the fan duct is mounted to the core nacelle so as to radially surround the core nacelle, wherein the static mounting structure is mounted to the core nacelle.

20. A system according to claim 17, wherein the one or more radially extending struts are outlet guide vanes that are arranged axially downstream of a plurality of first fan blades of the first propulsor and a plurality of second fan blades of the second propulsor such that the outlet guide vanes receive air from the second propulsor during use of the system.

* * * * *